United States Patent
Dickerson

[19]

[11] Patent Number: 6,164,423
[45] Date of Patent: Dec. 26, 2000

[54] VENTED ROTOR FOR CALIPER DISC BRAKES AND THE LIKE

[75] Inventor: Weston E. Dickerson, Okemas, Mich.

[73] Assignee: Hayes Lemmerz International, Inc., Northville, Mich.

[21] Appl. No.: 09/159,932

[22] Filed: Sep. 24, 1998

Related U.S. Application Data

[63] Continuation-in-part of application No. 08/939,871, Sep. 29, 1997, abandoned.
[60] Provisional application No. 60/045,428, May 2, 1997.

[51] Int. Cl.$^7$ ....................................... F16D 65/12
[52] U.S. Cl. ............................... 188/218 XL; 188/264 A
[58] Field of Search ..................... 188/264 A, 264 AA, 188/218 A, 218 XL

[56] References Cited

U.S. PATENT DOCUMENTS

| | | |
|---|---|---|
| 2,197,232 | 4/1940 | Wood . |
| 2,368,621 | 2/1945 | Tack . |
| 2,369,328 | 2/1945 | Watts . |
| 2,423,056 | 6/1947 | Tarbox . |
| 2,451,709 | 10/1948 | Baselt . |
| 2,477,500 | 7/1949 | Tack . |
| 2,627,325 | 2/1953 | Helsten . |
| 2,884,693 | 5/1959 | Wagner . |
| 3,171,527 | 3/1965 | Faurndau . |
| 3,394,780 | 7/1968 | Hodkinson . |
| 3,486,218 | 12/1969 | Buyze . |
| 4,026,393 | 5/1977 | Gebhardt et al. . |
| 4,501,346 | 2/1985 | Bogenschutz . |
| 4,638,891 | 1/1987 | Wirth ............................... 188/218 XL |
| 4,712,656 | 12/1987 | Courtois . |
| 4,809,827 | 3/1989 | Suzuki . |
| 4,811,822 | 3/1989 | Estaque . |
| 4,913,266 | 4/1990 | Russell et al. . |
| 4,928,798 | 5/1990 | Watson et al. . |
| 4,930,606 | 6/1990 | Sporzynski et al. . |
| 5,107,966 | 4/1992 | Metzler et al. . |
| 5,139,117 | 8/1992 | Melinat . |
| 5,161,652 | 11/1992 | Suzuki . |
| 5,325,941 | 7/1994 | Farinacci et al. . |
| 5,509,510 | 4/1996 | Ihm . |
| 5,544,726 | 8/1996 | Topouzian et al. . |

FOREIGN PATENT DOCUMENTS

| | | |
|---|---|---|
| 1961598 | 12/1969 | European Pat. Off. . |
| 037418 | 10/1973 | France . |
| 2108238 | 5/1983 | United Kingdom ............ 188/218 XL |

*Primary Examiner*—Chris Schwartz
*Attorney, Agent, or Firm*—Marshall & Melhorn

[57] ABSTRACT

A vented rotor for caliper disc brakes and the like includes an outer friction portion having two ring sections with a plurality of radially extending ribs extending therebetween. The ribs include support ribs extending from the hat wall, and secondary ribs space radially from the hat wall. The support ribs and secondary ribs fixedly interconnect the ring sections in a mutually parallel, spaced apart relationship in such a manner that the inner diameter of each the ring section is spaced apart from the hat wall. Vents are formed between the support ribs and secondary ribs. The vents have a constant cross sectional area along their length to enhance the airflow therethrough. As a result, cooling air is permitted to flow into the vents between the inboard and the outboard ring sections from both the inboard and outboard sides of the outer friction portion of the rotor, providing enhanced overall air flow past the ring sections.

9 Claims, 4 Drawing Sheets

VENTED ROTOR FOR CALIPER DISC BRAKES AND THE LIKE

RELATED APPLICATION

This application is a continuation-in-part of application Ser. No. 08/939,871, filed Sep. 29, 1997, abandoned, which is hereby incorporated by reference. This application is claiming the benefit, under 35 USC §119(e), of the provisional application filed May 2, 1997 under 35 USC §111(b), which was granted a Ser. No. of 60/045,428. The provisional application, Ser. No. 60/045,428, is hereby incorporated by reference.

BACKGROUND OF THE INVENTION

The present invention relates to rotors for caliper disc brakes and the like, and in particular to a vented rotor providing improved air flow.

Rotors are generally well known in the art, and are used extensively in caliper disc brakes, power transmission devices, clutches, and other similar machinery and mechanisms. Brake rotors are typically cast from a ferrous material, such as cast grey iron, and are then machined in multiple operations to shape the rotor, and form the opposite friction surfaces which interface with associated brake pads.

The ability of a brake rotor to quickly transfer and dissipate heat generated during the braking process is a very desirable feature, as excess heat leads to premature brake wear and/or failure. Corrosion is also a problem with cast iron brake rotors, particularly when used with spoked or windowed types of vehicles in which rotors are normally visible. Cast aluminum rotors are available to reduce the weight and corrosion problems associated with ferrous metal rotors, although the heat resistance and brake surface toughness of cast aluminum is typically less desirable than that of other types of rotors. In addition, there are some composite rotors available in which different portions of the rotor are formed of different materials.

SUMMARY OF THE INVENTION

The present invention is a vented rotor for caliper disc brakes and the like. The vented rotor includes an outer friction portion having two ring sections, an inboard ring and an outboard ring, with a plurality of radially extending ribs extending therebetween. The ribs fixedly interconnect the ring sections in a mutually parallel, spaced apart relationship. The ring sections have opposed friction surfaces which are adapted to interface with associated friction members.

The rotor of the invention also includes an inner hub or hat section having a central, outboard mounting face for mounting the rotor on a drive member and a hat wall which extends from the periphery of the mounting face. The ribs include a plurality of support ribs connected to the hat wall and extending radially outwards therefrom. The inner diameter of both of the ring sections is spaced apart from the hat wall. The ribs also include a plurality of secondary ribs spaced radially from the hat wall. As a result, cooling air is permitted to flow into the vents between the inboard and the outboard ring sections from both the inboard and outboard sides of the outer friction portion of the rotor, providing enhanced overall air flow past the ring sections.

The support ribs and secondary ribs are both preferably shaped so as to increase in width from the proximal or radially inner ends to the distal or radially outer ends thereof. Vents are defined between the support ribs and the secondary ribs. Due to the increasing width of the support ribs and secondary ribs, the vents have a substantially constant cross sectional area along their entire radial length. The constant cross sectional area increases the air flow through the vents by preventing the creation of pressure differentials from one end of the vent to the other.

An alternate embodiment of the rotor is similar to the rotor described above and includes support ribs having a constant width between the inner diameter of the ring sections and the distal end of the support ribs. Secondary ribs are disposed between the ring sections and spaced radially from the hat wall. The secondary ribs are preferably shaped so as to increase in width from the proximal or radially inner ends to the distal or radially outer ends thereof. Due to the increasing width of the secondary ribs and the constant width of the support ribs, the primary vents have a substantially constant cross sectional area along their entire radial length. The constant cross sectional area increases the air flow through the vents by preventing the creation of pressure differentials from one end of the vent to the other.

BRIEF DESCRIPTION OF THE DRAWINGS

The advantages of the invention will become readily apparent to those skilled in the art from the following detailed description of a preferred embodiment when considered in the light of the accompanying drawings, in which.

DETAILED DESCRIPTION OF THE PREFERRED EMBODIMENTS

Figure 1:
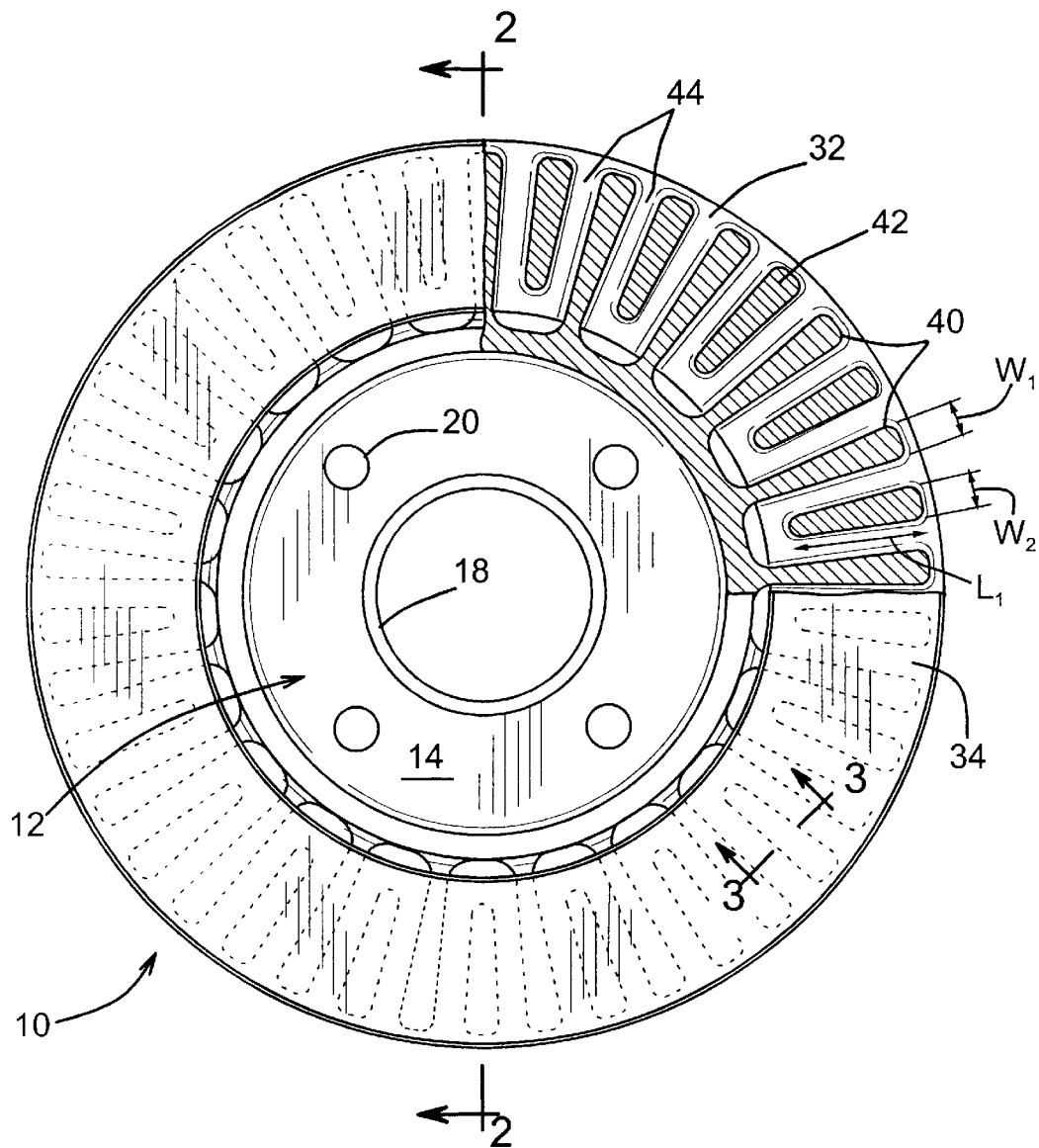
FIG. 1 is a fragmentary, front elevational view of a vented rotor embodying, the present invention.
Figure 2:
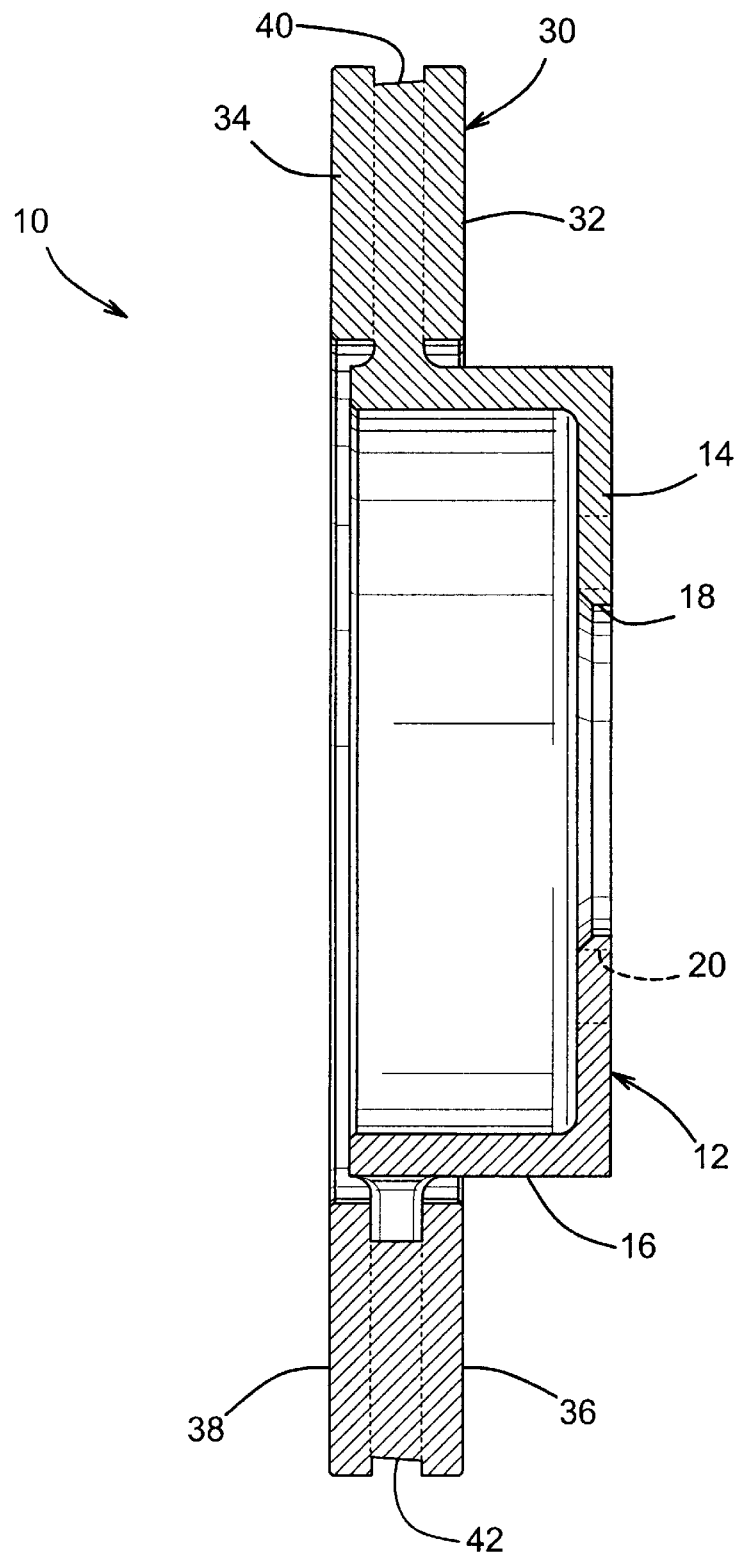
FIG. 2 is a cross-sectional view, taken along the line 2—2 in FIG. 1 of the vented rotor of the invention.

For purposes of description herein, the terms "upper," "lower," "right," "left," "rear," "front," "vertical," "horizontal," and derivatives thereof shall relate to the invention oriented in FIGS. 1 and 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
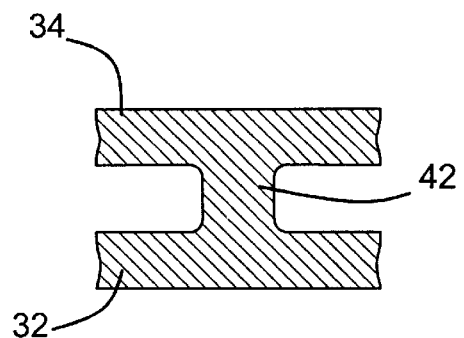
FIG. 3 is a cross-sectional view, taken along the line 3—3 in FIG. 1, of a rib interconnecting the ring sections of the rotor of FIG. 1.

Referring now to the drawings, there is illustrated in FIGS. 1–3, a vented rotor in accordance with the invention, denoted generally by the reference numeral 10. The rotor 10 is of the type adapted for use in conjunction with a variety of mechanical devices, such as caliper disc brakes and the like. The rotor 10 includes a radially inner hub or hat section 12 having a central mounting face 14 for mounting the rotor 10 on an associated drive member (not shown), such as a spindle or vehicle axle. The hat section 12 also includes a cylindrical shoulder or hat wall 16 extending from the periphery of the mounting face 14. The radially inner surface of the hat wall is unterrupted, that is it does not include vents formed therethrough, to increase the strength and rigidity of the hat wall.

The central mounting face 14 of the hat section 12 of rotor 10 is provided with a central pilot aperture 18 in which a spindle hub or the like (not shown) may be closely received, and a plurality of circumferentially spaced apart fastener apertures 20 in which fasteners (also not shown) may be received to mount the rotor 10 on an associated drive mechanism in the conventional manner.

The rotor 10 also includes an outer friction portion, denoted generally by the reference numeral 30 in the drawings. The outer friction portion 30 includes an outboard ring section 32 and an inboard ring section 34. The ring sections 32 and 34 have opposite, flat annular friction surfaces 36 and 38, respectively, which are adapted to interface with associated friction members (not shown), such as brake pads or the like.

The ring sections 32 and 34 are fixedly interconnected in a mutually parallel, spaced apart relationship by a plurality of circumferentially spaced apart ribs extending therebetween. The ribs include a plurality of circumferentially spaced apart support ribs 40 interconnected with the radially outer surface of the hat wall 16 of the hat section 12 proximate the inboard edge thereof (on the left as shown in FIG. 2). The support ribs 40 thereby fixedly interconnect the ring sections 32 and 34 with the hat section 12 of the rotor 10, but in a manner so that the inner diameter of both of the ring sections 32 and 34 is spaced radially apart from the outer diameter of the hat wall 16.

In the preferred embodiment illustrated in the drawings, a plurality of circumferentially spaced apart secondary ribs 42 are also provided. The secondary ribs 42, as best illustrated in FIG. 3, also fixedly interconnect the inboard ring section 32 with the outboard ring section 34. The secondary ribs 42, however, are spaced radially outwards from the radially outer surface of the hat wall 16 of the hat section 12, SO that the radially inner end of each of the ribs 42 does not extend radially inward of the inner diameter of the ring sections 32 and 34.

The support ribs 40 and the secondary ribs 42 are preferably arranged between the ring sections 32 and 34 with the secondary ribs 42 interspersed with the support ribs 40. In the illustrated embodiment, which is preferred, the support ribs 40 and secondary ribs 42 are arranged in an alternating fashion. The support ribs 40 have a width at the distal ends or radially outer ends illustrated as $W_1$, and the secondary ribs 42 have a width at the distal ends or radially outer ends illustrated as $W_2$. The support ribs 40 and secondary ribs 42 are both preferably shaped so as to increase in width from the proximal or radially inner ends to the distal or radially outer ends thereof, as best seen in FIG. 1, to further enhance the air flow within the outer friction portion 30 of the rotor 10. Of course, the shape, size and location of the ribs 40 and 42 can be varied to achieve the desired air flow characteristics.

Vents 44 are defined between the supports ribs 40, the secondary ribs 42 and the ring sections 32, 34. The radially inner and outer ends of the vents 44 are open to permit air to flow therethrough when the rotor turns. Due to the increasing width of the support ribs 40 and secondary ribs 42, the vents 44 have a substantially constant cross sectional area along their entire radial length $L_1$. The constant cross sectional area increases the air flow through the vents by preventing the creation of pressure differentials from one end of the vent to the other.

Thus, with the rotor 10 of the invention, air is permitted to flow into the spaces or vents 44 formed between the ribs 40 and 42 at the inner diameter of both the inboard and the outboard ring sections, 32 and 34 respectively. As a result, the overall air flow past the ring sections 32 and 34 within the outer friction portion 30 of the rotor 10 is enhanced. The enhanced air flow reduces the temperatures experienced by the rotor 10 during operation, thereby increasing the life of the rotor. The life of the associated brake pads is also potentially increased by use of the invention.

The rotor 10 of the invention may be formed of any suitable material, such as cast grey iron, aluminum or alloys or composites thereof, as examples. The rotor 10 may be formed using conventional manufacturing methods, such as casting. The rotor 10 is preferably formed of cast grey iron using conventional techniques with a core modified to provide for a rotor structure embodying the invention. That is, the vented rotor is preferably formed as a unified piece, wherein the hat section, support ribs, secondary ribs and ring sections are integrally formed.

Figure 4:
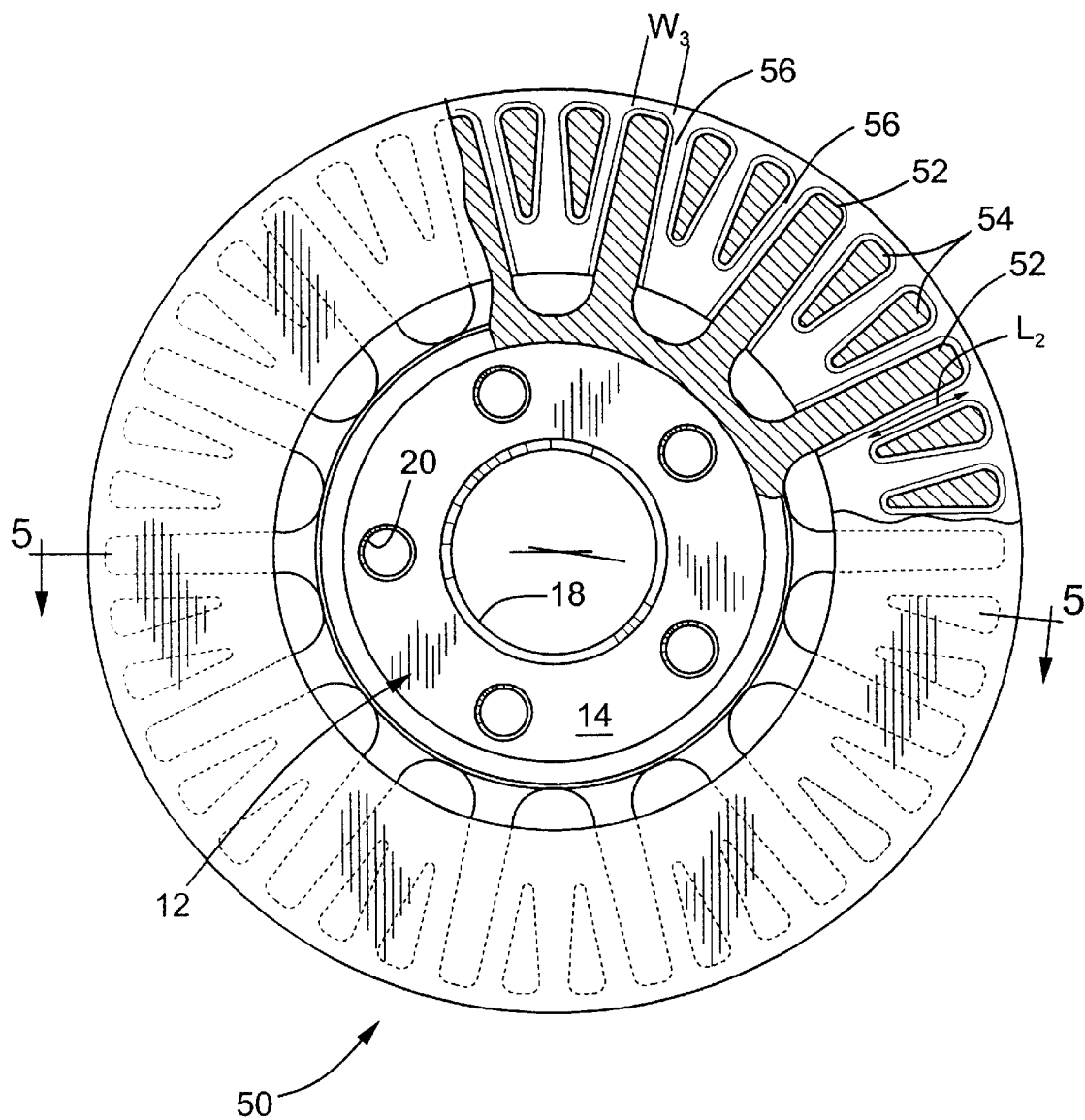
FIG. 4 is a fragmentary, front elevational view of a alternate embodiment of a vented rotor embodying the present invention.
Figure 5:
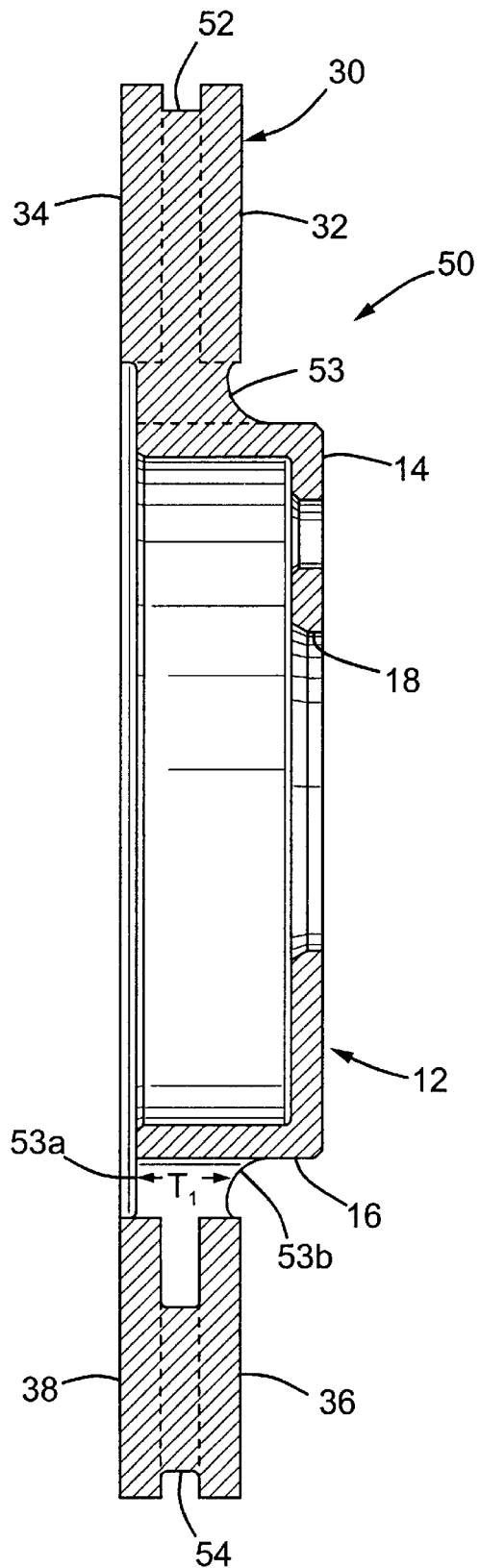
FIG. 5 is a cross-sectional view, taken along the line 5—5 in FIG. 4 of the vented rotor of the invention.

Referring now to FIGS. 4 and 5, an alternate embodiment of the rotor of the present invention is illustrated generally at 50. The rotor 50 is substantially similar to the rotor 10 described above, and similar components are labeled with similar reference numerals. The rotor 50 includes radially inner hub or hat section 12 having a central mounting face 14 and a cylindrical shoulder or hat wall 16 extending from the periphery of the mounting face 14. The rotor 50 also includes an outer friction portion including an outboard ring section 32 and an inboard ring section 34 as described above.

The ring sections 32 and 34 are fixedly interconnected in a mutually parallel, spaced apart relationship by a plurality of circumferentially spaced apart support ribs 52 extending therebetween. The support ribs 52 are interconnected with the radially outer surface of the hat wall 16 thereby fixedly interconnecting the ring sections 32 and 34 with the hat section 12 so that the inner diameter of both of the ring sections 32 and 34 is spaced radially apart from the outer diameter of the hat wall 16 as described above.

The support ribs 52 include a base portion 53 adjacent the hat wall 16. The base portion has a thickness $T_1$ defined between the inboard edge of the base portion 53a and the outboard edge of the base portion 53b. The thickness $T_1$ increases as the base portion gets closer to the hat wall 16 to provide more area where the support rib 52 meets the hat wall 16, thereby increasing the strength and rigidity of the support ribs and the outer friction portion 30. The support ribs 52 preferably have a constant width, illustrated as $W_3$, between the inner diameter of the rings sections 32, 34 and the distal end of the support ribs 52.

A plurality of circumferentially spaced apart secondary ribs 54 are provided which also fixedly interconnect the inboard ring section 32 with the outboard ring section 34. The secondary ribs 54, however, are spaced radially from the radially outer surface of the hat wall 16 in a similar manner as the secondary ribs 42 described above.

The support ribs 52 and the secondary ribs 54 are preferably arranged between the ring sections 32 and 34 with the two secondary ribs 54 disposed between consecutive support ribs 52. The secondary ribs 54 are preferably shaped so as to increase in width from the proximal or radially inner ends to the distal or radially outer ends thereof to further enhance the air flow within the outer friction portion 30 of the rotor 10. Of course, the shape, size and location of the ribs 52 and 54 can be varied to achieve the desired air flow characteristics.

A plurality of primary vents 56 are defined between the support ribs 52, the secondary ribs 54 and the ring sections 32, 34. The primary vents define a length $L_2$ extending between the radially inner and radially outer ends of the secondary vents 54. The radially inner and outer ends of the primary vents 56 are open to permit air to flow therethrough when the rotor 50 turns. Due to the increasing width of the secondary ribs 42 and the constant width of the support ribs 52, the primary vents 56 have a substantially constant cross sectional area along their entire radial length $L_2$. The constant cross sectional area increases the air flow through the vents by preventing the creation of pressure differentials from one end of the vent to the other.

The rotor 50 of the invention may be formed of any suitable material, such as cast grey iron, aluminum or alloys or composites thereof, as examples. The rotor 50 may be formed using conventional manufacturing methods, such as casting. The rotor 50 is preferably formed of cast grey iron using conventional techniques with a core modified to provide for a rotor structure embodying the invention. That is, the vented rotor 50 is preferably formed as a unified piece, wherein the hat section, support ribs, secondary ribs and ring sections are integrally formed.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A vented rotor comprising:
    a hat section including a central mounting face and a hat wall extending from said mounting face;
    a plurality of circumferentially spaced apart, generally radially extending support ribs formed integrally with said hat wall;
    a pair of annular ring sections interconnected in a mutually parallel, spaced apart relationship by the support ribs, said ring sections each having an inner diameter which is spaced apart from the hat wall of the hat section;
    a plurality of circumferentially spaced apart generally radially extending secondary ribs interconnecting said ring sections, said secondary ribs being interspersed with said support ribs and spaced radially from said hat wall; and
    radially extending vents defined between said support ribs and secondary ribs, wherein at least one of said support ribs and said secondary ribs are shaped so as to increase in width from the radially inner ends to the radially outer ends thereof such that each vent has a constant cross sectional area along the entire radial length of said vent.

2. A vented rotor as defined in claim 1, wherein the hat section, support ribs, secondary ribs and ring sections are integrally formed of cast grey iron.

3. A vented rotor as defined in claim 1, wherein said support ribs are shaped so as to increase in width from the radially inner ends to the radially outer ends thereof.

4. A vented rotor as defined in claim 3, wherein said secondary ribs are shaped so as to increase in width from the radially inner ends to the radially outer ends thereof.

5. A vented rotor as defined in claim 4, wherein the support ribs and secondary ribs are arranged in an alternating fashion.

6. A vented rotor as defined in claim 1, wherein said support ribs are shaped having a generally constant thickness between the radially inner diameter of said friction rings and the radially outer diameter of said friction rings.

7. A vented rotor as defined in claim 6, wherein said secondary ribs are shaped so as to increase in width from the radially inner ends to the radially outer ends thereof.

8. A vented rotor as defined in claim 7, wherein two of said secondary ribs are disposed between consecutive support ribs.

9. The vented rotor as defined in claim 1, wherein said support ribs include a base portion adjacent the hat wall having a thickness which increases as the base portion gets closer to the hat wall for increasing the strength and rigidity of the support ribs.

* * * * *